US012143749B2

(12) United States Patent
Kikuchi et al.

(10) Patent No.: US 12,143,749 B2
(45) Date of Patent: Nov. 12, 2024

(54) INFORMATION PROCESSING APPARATUS, INFORMATION PROCESSING SYSTEM, AND INFORMATION PROCESSING METHOD

(71) Applicants:Hidetoshi Kikuchi, Tokyo (JP); Keiko Tsuchiya, Tokyo (JP); Asami Tomaru, Tokyo (JP)

(72) Inventors: Hidetoshi Kikuchi, Tokyo (JP); Keiko Tsuchiya, Tokyo (JP); Asami Tomaru, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/931,599

(22) Filed: Sep. 13, 2022

(65) Prior Publication Data

US 2023/0079461 A1    Mar. 16, 2023

(30) Foreign Application Priority Data

Sep. 16, 2021 (JP) ................................ 2021-151223

(51) Int. Cl.
*H04N 7/14* (2006.01)
*G06Q 30/0601* (2023.01)
(52) U.S. Cl.
CPC .......... *H04N 7/141* (2013.01); *G06Q 30/0643* (2013.01); *H04N 2007/145* (2013.01)
(58) Field of Classification Search
CPC ........ G06F 17/60; H04N 7/173; H04N 7/141; G06Q 30/0643
USPC ...................................................... 348/14.02
See application file for complete search history.

(56) References Cited

U.S. PATENT DOCUMENTS

| 10,664,903 | B1 * | 5/2020 | Haitani | G02B 27/017 |
| 11,750,774 | B2 * | 9/2023 | Punwani | H04L 65/403 |
| | | | | 709/204 |
| 2019/0347703 | A1 * | 11/2019 | Bleicher | G06Q 30/0627 |
| 2020/0137353 | A1 * | 4/2020 | Stewart | H04N 7/147 |

(Continued)

FOREIGN PATENT DOCUMENTS

| JP | 2003331152 | * | 5/2002 | ............ H04N 7/17 |
| JP | 2012216116 | * | 6/2006 | ............ G06F 17/60 |
| JP | 2010-198168 | | 9/2010 | |

(Continued)

OTHER PUBLICATIONS

Japanese Office Action for 2021-151223 mailed on Aug. 1, 2023.

*Primary Examiner* — Maria El-Zoobi
(74) *Attorney, Agent, or Firm* — IPUSA, PLLC

(57) ABSTRACT

An information processing apparatus is communicable with a first user terminal operated by a first user and a second user terminal operated by a second user. The information processing apparatus includes circuitry. The circuitry generates distribution data according to which the first user terminal displays a first captured image and a second captured image, the first captured image being an image captured by a first image capturing device in a photographing direction selected by the first user, the second captured image being an image captured by a second image capturing device in a photographing direction of the second user. The circuitry transmits the generated distribution data to the first user terminal. The circuitry provides a bidirectional communication function to the first user terminal and the second user terminal.

16 Claims, 10 Drawing Sheets

(56) References Cited

U.S. PATENT DOCUMENTS

2021/0400195 A1* 12/2021 Adato .................. G06T 7/0006
2023/0196688 A1* 6/2023 Kobel ................ G06F 3/04815
345/633

FOREIGN PATENT DOCUMENTS

JP 2019-197427 11/2019
WO WO2016/093063 A1 6/2016

* cited by examiner

FIG. 5A

| FLOOR | STORE TYPE | STORE COUNTER | DEVICE ID | ROOM URL |
|---|---|---|---|---|
| 13 | RESTAURANT | ... | T013 | ... |
| 1 | SPECIAL COSMETICS | BRAND B | T002 | http://www.abc.com/service-user1.html |
| | | BRAND F | T005 | http://www.abc.com/service-user2.html |
| B1 | FOODS | BOXED LUNCHES, SUSHI | B1-001 | http://www.abc.com/service-user3.html |
| | | SIDE DISH | B1-002 | http://www.abc.com/service-user4.html |
| | | SWEETS | B1-003 | http://www.abc.com/service-user5.html |
| | | ... | ... | ... |

FIG. 5B

| SHELF IMAGE ID | DEVICE ID | ROOM URL |
|---|---|---|
| 001 | T001 | http://www.abc.com/service-user10.html |
| ... | ... | ... |
| 005 | T005 | http://www.abc.com/service-user11.html |
| ... | ... | ... |
| 008 | T008 | http://www.abc.com/service-user12.html |

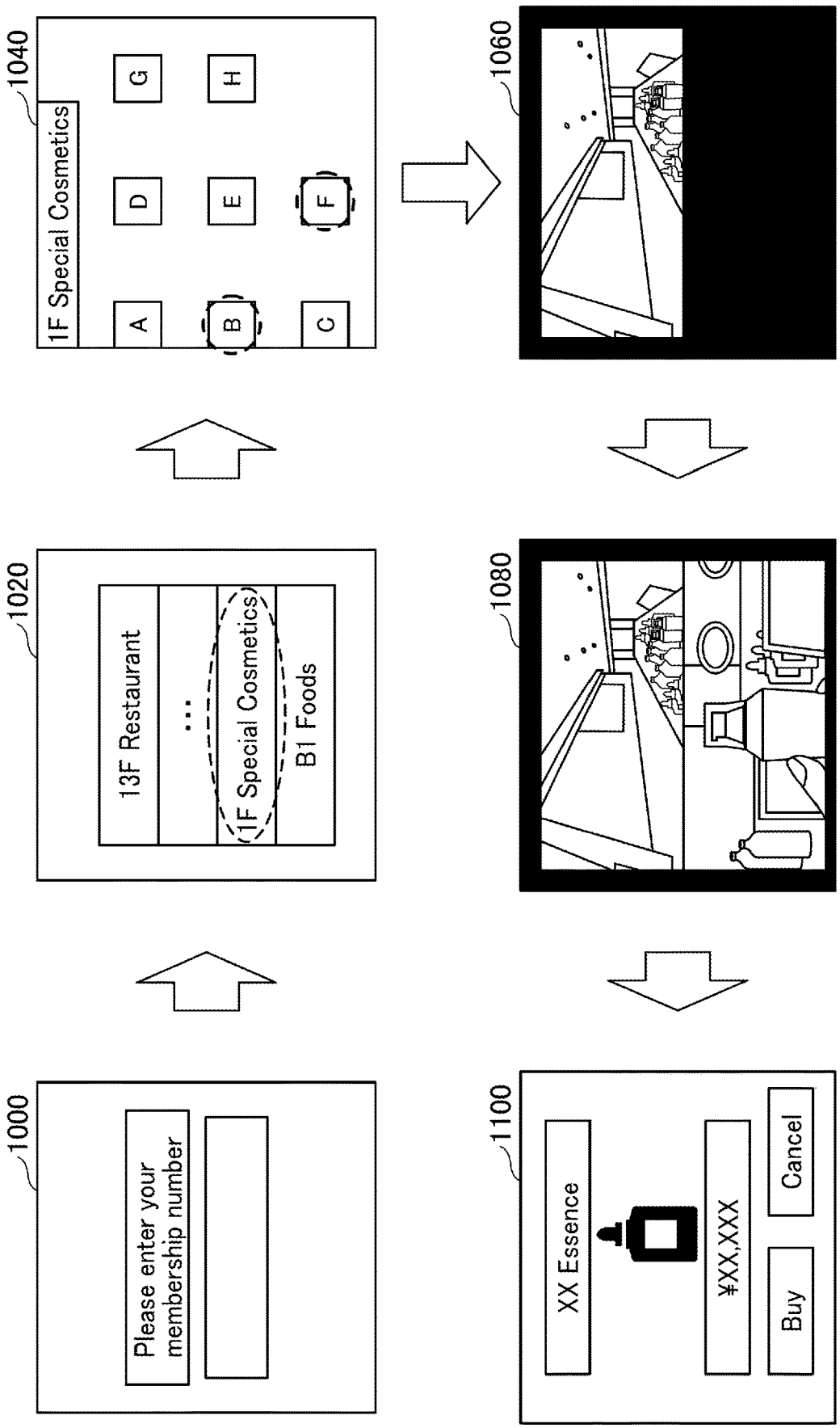

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2021-151223, filed on Sep. 16, 2021, in the Japan Patent Office, the entire disclosure of which is hereby incorporated by reference herein.

BACKGROUND

Technical Field

Embodiments of the present disclosure relate to an information processing apparatus, an information processing system, and an information processing method.

Related Art

Support systems are known that introduce products by way of live video to a smartphone terminal in response to a request from a mobile application of the smartphone terminal and post a text comment or implement an exchange for each product.

SUMMARY

An embodiment of the present disclosure includes an information processing apparatus communicable with a first user terminal operated by a first user and a second user terminal operated by a second user. The information processing apparatus includes circuitry. The circuitry generates distribution data according to which the first user terminal displays a first captured image and a second captured image, the first captured image being an image captured by a first image capturing device in a photographing direction selected by the first user, the second captured image being an image captured by a second image capturing device in a photographing direction of the second user. The circuitry transmits the generated distribution data to the first user terminal. The circuitry provides a bidirectional communication function to the first user terminal and the second user terminal.

An embodiment of the present disclosure includes an information processing system including a first user terminal operated by a first user, a second user terminal operated by a second user, and an information processing apparatus. The first user terminal, the second user terminal, and the information processing apparatus are communicable with one another. The information processing apparatus includes first circuitry. The first circuitry generates distribution data according to which the first user terminal displays a first captured image and a second captured image, the first captured image being an image captured by a first image capturing device in a photographing direction selected by the first user, the second captured image being an image captured by a second image capturing device in a photographing direction of the second user. The first circuitry transmits the generated distribution data to the first user terminal. The first circuitry provides a bidirectional communication function to the first user terminal and the second user terminal. The first user terminal includes second circuitry. The second circuitry displays the first captured image and the second captured image based on the distribution data received from the information processing apparatus. The second circuitry performs processing that allows the first user to perform bidirectional communication with the second user. The second user terminal includes third circuitry to perform processing that allows the second user to perform the bidirectional communication with the first user.

An embodiment of the present disclosure includes an information processing method performed by an information processing apparatus communicable with a first user terminal operated by a first user and a second user terminal operated by a second user. The method includes generating distribution data according to which the first user terminal displays a first captured image and a second captured image, the first captured image being an image captured by a first image capturing device in a photographing direction selected by the first user, the second captured image being an image captured by a second image capturing device in a photographing direction of the second user. The method includes transmitting the generated distribution data to the first user terminal. The method includes providing a bidirectional communication function to the first user terminal and the second user terminal.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5A and FIG. 5B are tables of an example of a data structure of the distribution settings information, according to an embodiment of the present disclosure;

FIG. 7 is a diagram illustrating an example of a usage scene of the information processing system, according to an embodiment of the present disclosure;

Figure 1:
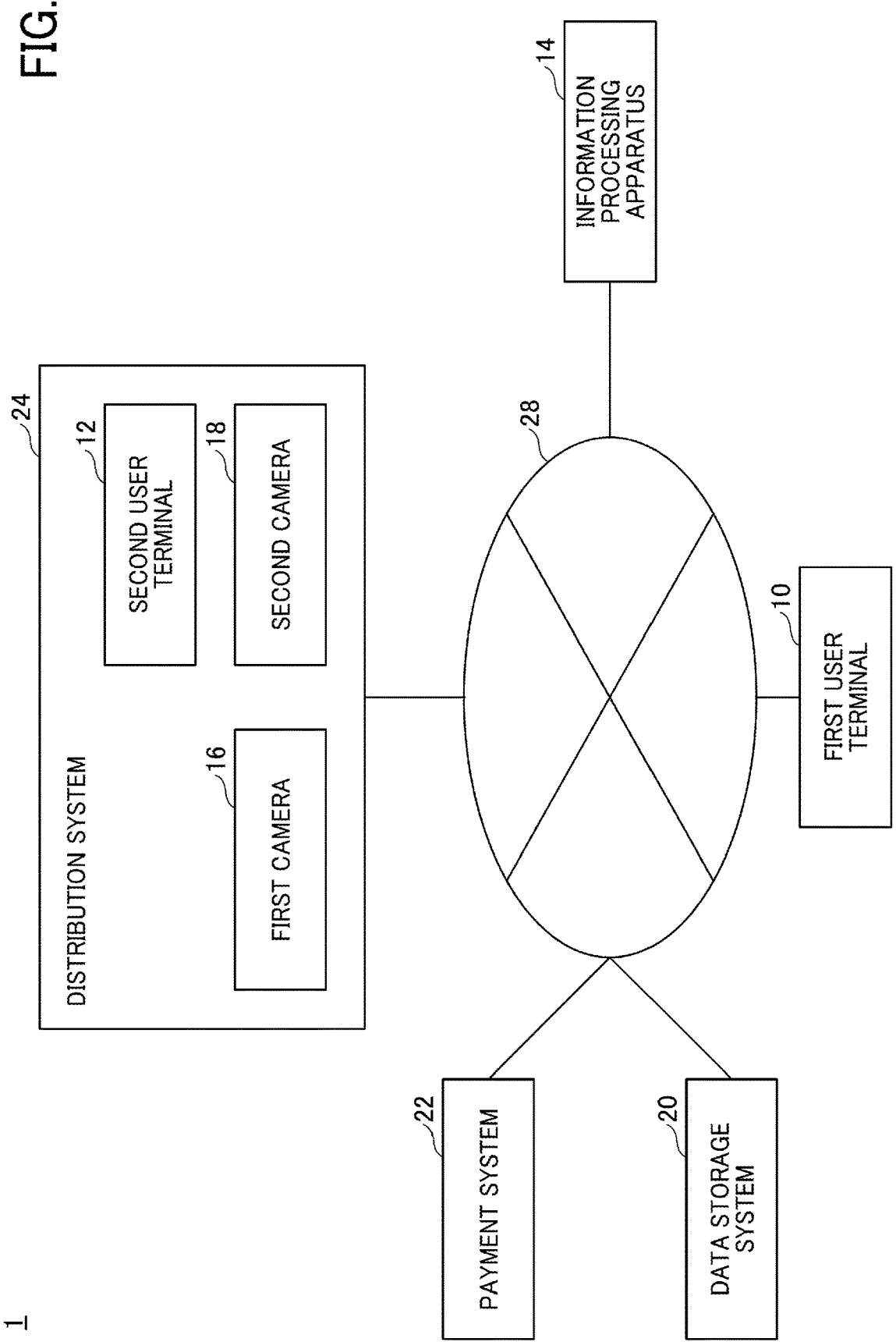
FIG. 1 is a schematic diagram illustrating an example of a configuration of an information processing system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, embodiments of the present disclosure are described. Although in the present embodiment, an example is described in which a first user is a purchaser (an example of a person who performs acquisition) or a prospective purchaser (an example of a person who is expected to perform acquisition) of a product and a second user is a seller of a product, this is merely one example. For example, the first user is not limited to a user who purchases a product. The first user can be any user provided that the user performs communication with the second user while displaying, on a first user terminal, a second captured image captured by a second user with a wearable camera or a camera built in a smartphone, for example.

First Embodiment

System Configuration

FIG. 1A is a schematic diagram illustrating an example of a configuration of an information processing system 1, according to the present embodiment. The information processing system 1 illustrated in FIG. 1 includes a first user terminal 10, a second user terminal 12, an information processing apparatus 14, a first camera 16, a second camera 18, a data storage system 20, and a payment system 22, which communicate with one another through a network 28. The second user terminal 12, the first camera 16, and the second camera 18 function as a distribution system 24. Examples of the network 28 include, but are not limited to, the Internet and a local area network (LAN).

The first user terminal 10 (first user terminal using the information processing system 1) is an information processing terminal operated by a purchaser or a prospective purchaser of a product. In the following description, the purchaser or the prospective purchaser of a product may be referred to simply as "purchaser or the like". Examples of the first user terminal 10 include, but are not limited to, a personal computer (PC), a mobile phone, a smartphone, a tablet terminal, a game console, and a personal digital assistant.

The second user terminal 12 (second user terminal using the information processing system 1) is an information processing terminal operated by a seller of a product such as a person in charge of a store, for example. Examples of the second user terminal 12 include, but are not limited to, a PC, a mobile phone, a smartphone, a tablet terminal, a game console, and a PDA.

The information processing apparatus 14 is an example of an information providing system that provides a service according to the present embodiment. Examples of the information processing apparatus 14 include, but are not limited to, a PC and a workstation. In another example, the information processing apparatus 14 is implemented by a server apparatus, an application service provider (ASP), or cloud computing.

The first camera 16 is located in, for example, a product sales floor. The first camera 16 photographs a 360-degree image of the surroundings to obtain a captured image, and distributes the captured image to the first user terminal 10 as a live moving image of the product sales floor. As the first camera 16, a currently-provided digital camera that obtains a full spherical panoramic image of 360 degrees in a single shooting is used, for example. Such the image capturing device that photographs a 360-degree image is merely one example of the first camera 16. In another example, an image capturing device that can perform a pan operation of swinging an imaging direction in the horizontal direction and a tilt operation of swinging the imaging direction in the vertical direction from the first user terminal 10 is used as the first camera 16. The first camera is an example of a first image capturing device.

The second camera 18 is, for example, a wearable camera worn by the seller, or a built-in camera of the second user terminal 12 operated by the seller. The wearable camera is a camera that the seller wears on his/her head or shoulder and photographs an image of a direction in which the seller is looking with hands-free. In the following description, the image of the direction in which the seller is looking may be referred to as "line-of-sight image." In another example, a built-in camera of various smart devices such as a smartphone and smartglasses is used as the second camera 18. The second camera 18 performs communication directly or via the second user terminal 12. The second camera 18 photographs the seller's line-of-sight image to obtain a captured image, and distributes the captured image to the first user terminal 10 as a live moving image of a product. The second camera is an example of a second image capturing device.

The first user terminal 10 and the second user terminal 12 provide the purchaser or the like and the seller with a bidirectional communication function by voice using, for example, a call function, packet communication by voice data, Web Real-Time Communication (WebRTC), or a bidirectional communication function by characters (text) using, for example, a chat function.

The data storage system 20 stores the captured image obtained by photographing by the first camera 16, the captured image obtained by photographing by the second camera 18, information exchanged between the purchaser or the like and the seller with the communication function, etc. The payment system 22 provides a payment function of a product.

The first user terminal 10 displays the captured image distributed from the first camera 16. For example, the first user terminal 10 uses the captured image obtained by a digital camera that obtains a 360-degree full spherical panoramic image as described above, to display a captured image in a photographed direction selected according to an operation of the purchaser or the like from the 360-degree image of the sales floor. The purchaser or the like can check products arranged in the sales floor of a store such as a department store by viewing the captured image displayed on the first user terminal 10.

If the purchaser or the like finds a product that he/she is attracted, the purchaser or the like operates the first user terminal 10 to call the second user terminal 12 operated by the seller and start bidirectional communication with the seller. The first user terminal 10 displays the captured image of the product based on the seller's line-of-sight image distributed from the second camera 18. The purchaser or the like receives an explanation of the product from the seller while viewing the captured image of the product displayed on the first user terminal 10. The purchaser or the like can consider whether to buy the product based on the explanation and the displayed captured image.

For example, when a person actually goes to a sales floor of a store such as a department store to purchase a product, a purchaser or the like moves while looking at products arranged in the sales floor, and if he/she finds a product that attracts his/her interest, the purchaser or the like approaches the product to check the product or asks a seller for a description of the product. According to the present embodiment, the purchaser or the like can check products arranged in a sales floor based on the image captured by the first camera 16, and can start bidirectional communication with the seller after finding the product that attract interest of the purchaser or the like. Further, according to the present embodiment, after starting the bidirectional communication with the seller, the purchaser or the like can receive the explanation of the product from the seller while viewing the image of the product captured by the second camera 18, and can consider whether to buy the product.

The configuration of the information processing system 1 illustrated in FIG. 1 is merely one example. For example, at least a part of the functions of the information processing apparatus 14 may be provided in the first user terminal 10. Further, for example, at least a part of the functions of the first user terminal 10 and the second user terminal 12 may be provided in the information processing apparatus 14. Furthermore, for example, at least a part of the functions of the data storage system 20 and the payment system 22 may be provided in the information processing apparatus 14. The configuration of the data storage system 20 may be omitted.

Hardware Configuration

Hardware Configuration of Computer

Figure 2:
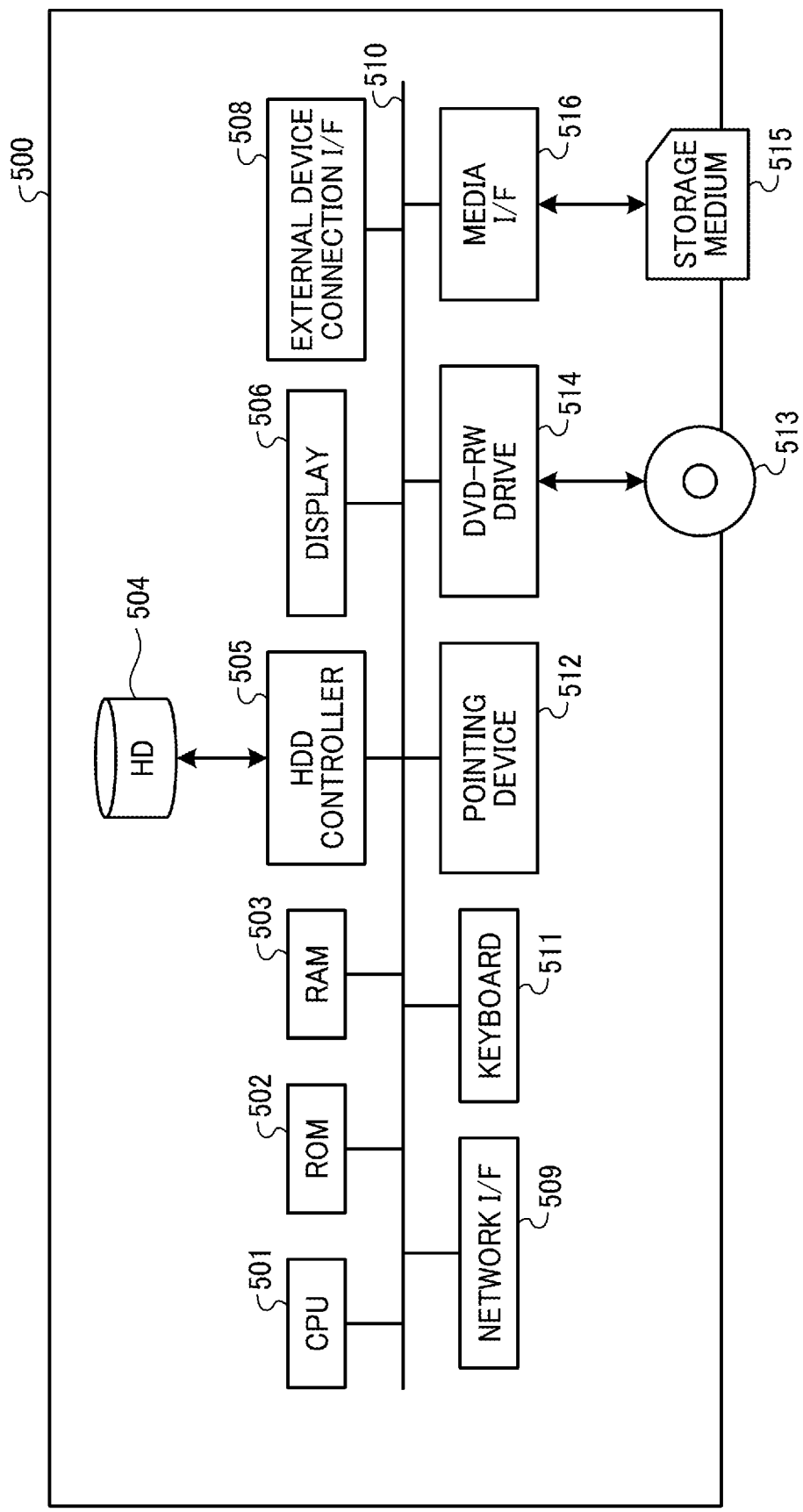
FIG. 2 is a block diagram illustrating an example of a hardware configuration of a computer, according to an embodiment of the present disclosure.

Each of the information processing apparatus 14, the data storage system 20, and the payment system 22 of FIG. 1 is implemented by, for example, a computer 500 having a hardware configuration as illustrated in FIG. 2. In a case where each of the first user terminal 10 and the second user terminal 12 of FIG. 1 is a PC, each of the first user terminal and the second user terminal is implemented by, for example, the computer 500 having a hardware configuration as illustrated in FIG. 2. FIG. 2 is a block diagram illustrating an example of a hardware configuration of the computer 500, according to the present embodiment.

The computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

The CPU 501 performs overall control of the computer 500 according to a program. The ROM 502 stores a program such as an initial program loader (IPL) to boot the CPU 501. The RAM 503 is used as a work area for the CPU 501. The HD 504 stores various data such as the program. The HDD controller 505 controls reading or writing of various data with respect to the HD 504 under control of the CPU 501.

The display 506 displays various information such as a cursor, a menu, a window, a character, or an image. The external device connection I/F 508 is an interface that connects the computer 500 to various external devices. Examples of the external devices include, but are not limited to, a universal serial bus (USB) memory. The network I/F 509 is an interface for performing data communication using the network 28. Examples of the data bus 510 include, but are not limited to, an address bus and a data bus, which electrically connects the components, such as the CPU 501, with one another.

The keyboard 511 is an example of an input device provided with a plurality of keys that allows a user to input characters, numerals, or various instructions. The pointing device 512 is an example of an input device that allows a user to select or execute a specific instruction, select a target for processing, or move a cursor being displayed. The DVD-RW drive 514 controls reading and writing of various data from and to a DVD-RW 513, which is an example of a removable storage medium. The DVD-RW is merely one example of the removable storage medium. In another example, a digital versatile disk recordable (DVD-R) is used as the removable storage medium. The medium I/F 516 controls reading and writing (storing) of data from and to a storage medium 515 such as a flash memory.

The hardware configuration illustrated in FIG. 2 is merely one example, and the computer 500 may not include all of the components illustrated in FIG. 2, or may include any hardware components in addition to the components illustrated in FIG. 2.

Hardware Configuration of Smartphone

Figure 3:
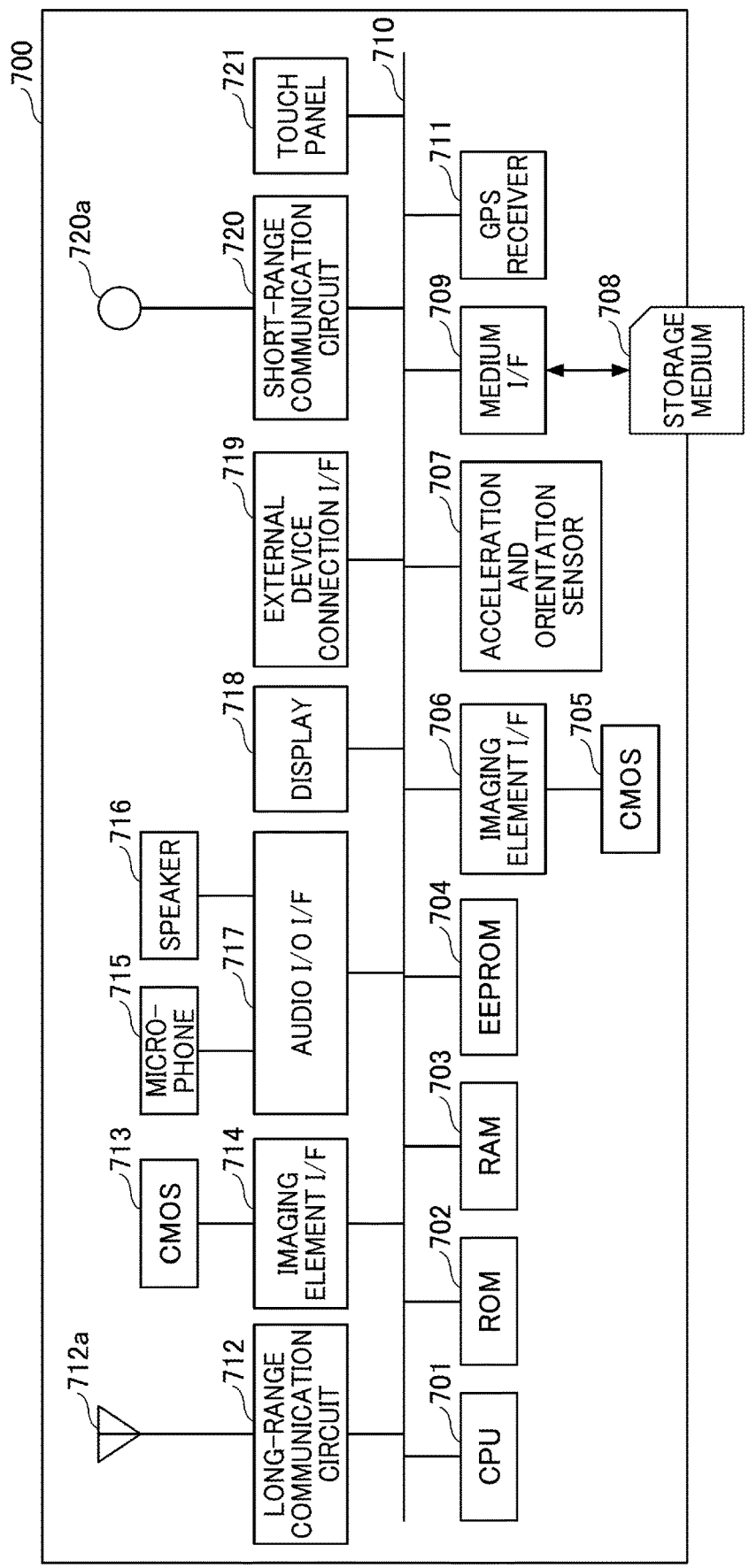
FIG. 3 is a block diagram illustrating an example of a hardware configuration of a smartphone, according to an embodiment of the present disclosure.

Each of the first user terminal 10 and the second user terminal 12 of FIG. 1 is implemented by, for example, a smartphone 700 having a hardware configuration as illustrated in FIG. 3. FIG. 3 is a block diagram illustrating an example of the hardware configuration of the smartphone 700, according to the present embodiment. As illustrated in FIG. 3, the smartphone 700 includes a CPU 701, a ROM 702, a RAM 703, an electrically erasable and programmable ROM (EEPROM) 704, a complementary metal oxide semiconductor (CMOS) sensor 705, an imaging element I/F 706, an acceleration and orientation sensor 707, a medium I/F 709, and a global positioning system (GPS) receiver 711.

The CPU 701 controls overall operation of the smartphone 700. The ROM 702 stores a program such as an IPL to boot the CPU 701. The RAM 703 is used as a work area for the CPU 701. The EEPROM 704 reads or writes various data such as a program for a smartphone 700 under control of the CPU 701.

The CMOS sensor 705 is an example of a built-in imaging device configured to capture an object (mainly, a self-image of a user operating the smartphone 700) under control of the CPU 701 to obtain image data. In alternative to the CMOS sensor 705, an imaging element such as a charge-coupled device (CCD) sensor may be used. The imaging element I/F 706 is a circuit that controls driving of the CMOS sensor 705. Examples of the acceleration and orientation sensor 707 include, but are not limited to, an electromagnetic compass or gyrocompass for detecting geomagnetism and an acceleration sensor.

The medium I/F 709 controls reading or writing (storing) of data from or to a storage medium 708 such as a flash memory. The GPS receiver 711 receives a GPS signal from a GPS satellite.

The smartphone 700 further includes a long-range communication circuit 712, a CMOS sensor 713, an imaging element I/F 714, a microphone 715, a speaker 716, an audio input/output I/F 717, a display 718, an external device connection I/F 719, a short-range communication circuit 720, an antenna 720a for the short-range communication circuit 720, and a touch panel 721.

The long-range communication circuit 712 is a circuit that allows the smartphone 700 to communicate with other devices through the network 28.

The CMOS sensor 713 is an example of a built-in imaging device that captures an object under control of the CPU 701 to obtain image data. The imaging element I/F 714 is a circuit that controls driving of the CMOS sensor 713. The microphone 715 is a built-in circuit that converts sound into an electric signal.

The speaker 716 is a built-in circuit that generates sound such as music or voice by converting an electric signal into physical vibration.

The audio input/output I/F 717 is a circuit for inputting or outputting an audio signal between the microphone 715 and the speaker 716 under control of the CPU 701. The display 718 is an example of a display device that displays an image of the object, various icons, etc. Examples of the display 718 include, but are not limited to, a liquid crystal display (LCD) and an organic electroluminescence (EL) display. The external device connection I/F 719 is an interface for connecting the smartphone 700 to various external devices.

The short-range communication circuit 720 is a communication circuit in compliance with, for example, the near field communication (NFC) or Bluetooth®. The touch panel 721 is an example of an input device that allows a user to operate the smartphone 700 by touching a screen of the display 718.

The smartphone 700 further includes a bus line 710. Examples of the bus line 710 include, but are not limited to, an address bus and a data bus that electrically connects the elements illustrated in FIG. 3 such as the CPU 701.

Functional Configuration

Figure 4:
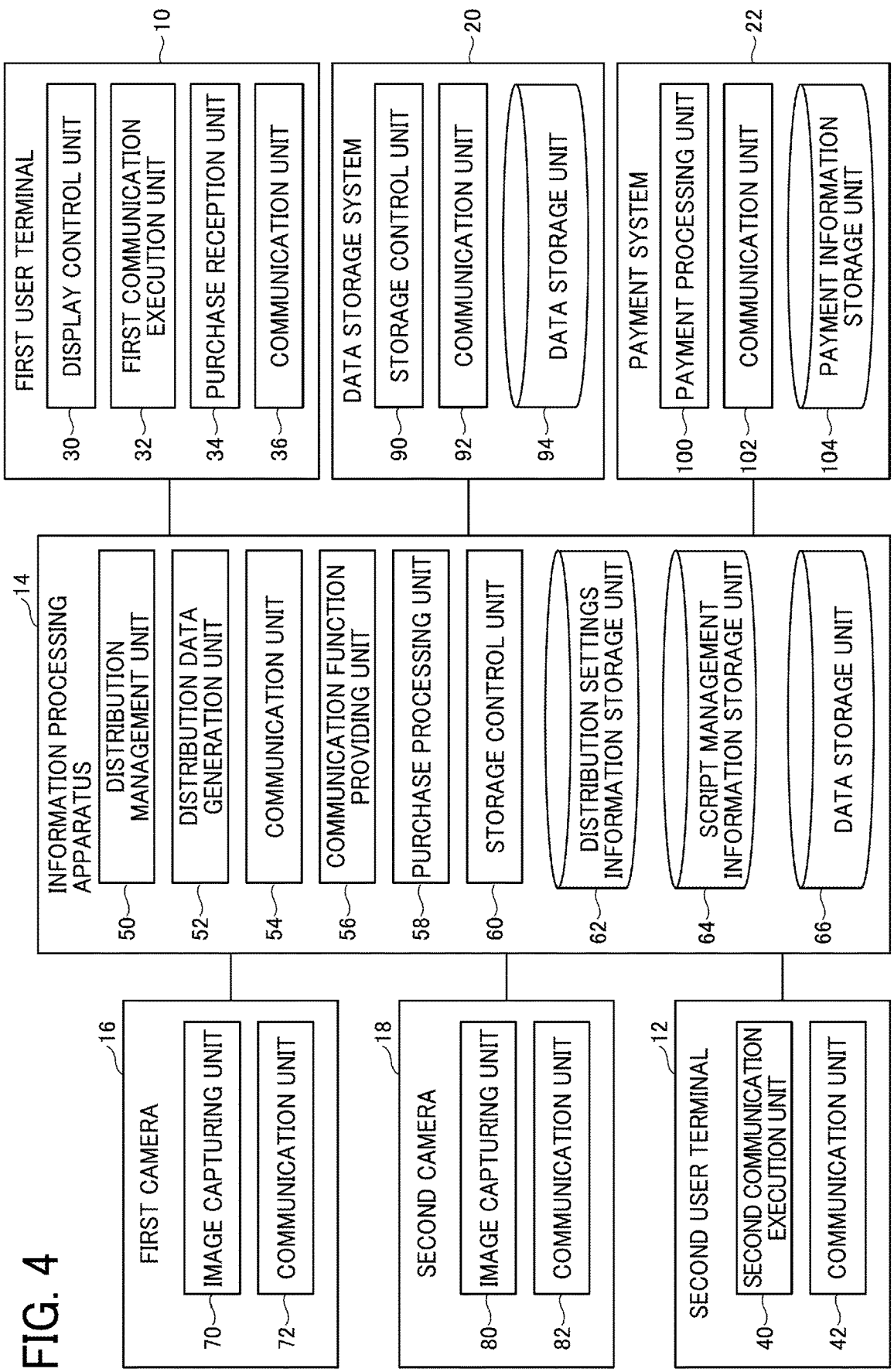
FIG. 4 is a block diagram illustrating an example of a functional configuration of the information processing system, according to an embodiment of the present disclosure.

The information processing system 1 according to the present embodiment is implemented, for example, by a functional configuration illustrated in FIG. 4. FIG. 4 is a block diagram illustrating a functional configuration of the information processing system 1 according to the present embodiment. In the description of the functional configuration illustrated in FIG. 4, descriptions of components unnecessary for the description of the present embodiment may be omitted. The first user terminal 10, the second user terminal 12, the information processing apparatus 14, the first camera 16, the second camera 18, the data storage system 20, and the payment system 22 implement, for example, the functional configuration of FIG. 4 by executing programs such as an operating system (OS) and an application.

The first camera 16 includes an image capturing unit 70 and a communication unit 72. The image capturing unit 70 photographs an image of a 360-degree view around the first camera 16. The communication unit 72 transmits the captured image captured by the image capturing unit 70 to the information processing apparatus 14. For example, the communication unit 72 transmits the captured image to a registered uniform resource locator (URL), to transmit the captured image to the information processing apparatus 14. The URL is defined in distribution settings.

The second camera 18 includes an image capturing unit 80 and a communication unit 82. The image capturing unit 80 photographs an image of a view of an image-capturing direction of the second camera 18. The communication unit 82 transmits the captured image captured by the image capturing unit 80 to the information processing apparatus 14. For example, the communication unit 82 transmits the captured image to a registered URL, to transmit the captured image to the information processing apparatus 14. In another example, the second camera 18 transmits the captured image to the information processing apparatus 14 via the second user terminal 12. In still another example, the second camera 18 is built in the second user terminal 12.

The information processing apparatus 14 includes a distribution management unit 50, a distribution data generation unit 52, a communication unit 54, a communication function providing unit 56, a purchase processing unit 58, a storage control unit 60, a distribution settings information storage unit 62, a script management information storage unit 64, and a data storage unit 66.

The distribution management unit 50 performs processing relating to distribution of the captured images received from the first camera 16 and the second camera 18 to the first user terminal 10. The distribution data generation unit 52 generates distribution data (image data) of a display screen based on which the image captured by the first camera 16 and the image captured by the second camera 18 are displayed at the first user terminal 10.

For example, according to an input operation by the purchaser or the like, such as an operation by the purchaser or the like of calling the seller, the distribution data generation unit 52 generates the distribution data based on which the image captured by the second camera 18 is added to the display screen on which the image captured by the first camera 16 is being displayed. In another example, according to an input operation by the purchaser or the like, such as an operation by the purchaser or the like of calling the seller, the distribution data generation unit 52 generates the distribution data based on which the display screen is switched from a display screen displaying the image captured by the first camera 16 to a display screen displaying the image captured by the second camera 18. The distribution data generation unit 52 transmits the generated distribution data to the first user terminal 10 via the communication unit 54.

The communication unit 54 communicates with the first user terminal 10, the second user terminal 12, the first camera 16, the second camera 18, the data storage system 20, and the payment system 22. The communication function providing unit 56 provides the purchaser who uses the first user terminal 10 and the seller who uses the second user terminal 12 with a voice communication function using a call function or a text communication function using a chat function.

The purchase processing unit 58 receives a purchase instruction that instructs a purchase of a product appearing in the image captured by the second camera 18 from the first user terminal 10 operated by the purchaser or the like. Based on the received purchase instruction, the purchase processing unit 58 performs processing of purchasing the product. The purchase instruction is an example of an acquisition instruction. The storage control unit 60 causes the data storage unit 66 or the data storage system 20 to store at least one of the image captured by the first camera 16, the image captured by the second camera 18, and information exchanged between the purchaser or the like and the seller with the communication function.

Images captured by the first camera 16 and images captured by the second camera 18, which are stored in the data storage unit 66 or the data storage system 20, and the information exchanged between the purchaser or the like and the seller with the communication function may be used as big data. The images captured by the first camera 16 and the images captured by the second camera 18, which are stored in the data storage unit 66 or the data storage system 20, and the information exchanged between the purchaser or the like and the seller with the communication function may be used, for example, for training for sellers or secondary use of data.

The distribution settings information storage unit 62 stores distribution settings information described below. The script management information storage unit 64 manages a script. The script is a program for displaying a 360-degree image at the first user terminal 10 that is not installed with an application for displaying a 360-degree image. The data storage unit 66 stores at least one of the image captured by the first camera 16, the image captured by the second camera 18, and the information exchanged between the purchaser or the like and the seller with the communication function.

The first user terminal 10 includes a display control unit 30, a first communication execution unit 32, a purchase reception unit 34, and a communication unit 36. The display control unit 30 displays a display screen that includes the image captured by the first camera 16 and the image captured by the second camera 18 based on the distribution data of the display screen received from the information processing apparatus 14.

The first communication execution unit 32 performs processing that allows the purchaser or the like who operates the first user terminal 10 to perform bidirectional communication with the seller who operates the second user terminal 12. The purchase reception unit 34 receives a purchase instruction that instructs a purchase of a product appearing in the image captured by the second camera 18 from the purchaser or the like. The communication unit 36 communicates with the information processing apparatus 14.

The second user terminal 12 includes a second communication execution unit 40 and a communication unit 42. The second communication execution unit 40 performs processing that allows the seller who operates the second user terminal 12 to perform bidirectional communication with the purchaser or the like who operates the first user terminal 10. The communication unit 42 communicates with the information processing apparatus 14.

The data storage system 20 includes a storage control unit 90, a communication unit 92, and a data storage unit 94. The storage control unit 90 controls storage of the image captured by the first camera 16, the image captured by the second camera 18, and the information exchanged between the purchaser or the like and the seller with the communication function, which are received from the information processing apparatus 14. The communication unit 92 communicates with the information processing apparatus 14. The data storage unit 94 stores at least one of the image captured by the first camera 16, the image captured by the second camera 18, and the information exchanged between the purchaser or the like and the seller with the communication function.

The payment system 22 includes a payment processing unit 100, a communication unit 102, and a payment information storage unit 104. The payment processing unit 100 performs payment processing according to the purchase instruction of a product from the purchaser or the like who operates the first user terminal 10. The communication unit 102 communicates with the information processing apparatus 14. The payment information storage unit 104 stores payment information relating to the performed payment processing.

The functional configuration of FIG. 4 is merely one example. In another example, a part of the functions of the information processing apparatus 14 may be provided in the first user terminal 10. In another example, the distribution data generation unit 52 of the information processing apparatus 14 may be provided in the first user terminal 10. The functional configuration of the information processing apparatus 14 may be implemented by multiple server apparatuses.

If the first user terminal 10 is installed with an application for displaying a 360-degree image displays a 360-degree image without using a script. For this reason, the script management information storage unit 64 may be omitted from the information processing apparatus 14, if there is no first user terminal 10 on which an application for displaying a 360-degree image is not installed.

The distribution settings information storage unit 62 of the information processing apparatus 14 illustrated in FIG. 4 stores distribution settings information as illustrated in FIG. 5A and FIG. 5B, for example. FIG. 5A and FIG. 5B are tables of an example of data structure of the distribution settings information. The distribution settings information of FIG. 5 has a configuration in which an URL for transmitting the image captured by the first camera 16 is set.

The table of FIG. 5A includes one or more records each of which has data items of "floor", "store type", "store counter", "device ID", and "room URL." ID is an abbreviation of identifier. The "floor" is an example of information that groups sales areas of products, and represents a level such as first basement floor (B1) or the first floor. The "store type" is an example of information indicating a type of sales areas of products, and indicates a type of sales areas such as a restaurant, special selection cosmetics, or food.

The "store counter" is an example of information representing a sales area, and is, for example, a sales area in which special selection cosmetics are classified by brands, or a sales area in which foods are classified by ingredients. The "device ID" is an example of information identifying the first camera 16 located in the sales floor. The room URL is an example of the registered URL to which the captured image is to be transmitted.

The table of FIG. 5B includes one or more records each of which has data items of "shelf image ID", "device ID", and "room URL." The shelf image ID is an example of information indicating a sales floor of products, and is a sales floor classified by shelfs on which products are displayed. The room URL is an example of the registered URL to which the captured image is to be transmitted.

According to the distribution settings information of FIG. 5, by designating a sales floor of a product, it is possible to identify a particular room URL which is an example of a particular URL to which the image captured by the first camera 16 located in the sales floor is to be transmitted.

First Display Area and Second Display Area

Figure 6A:
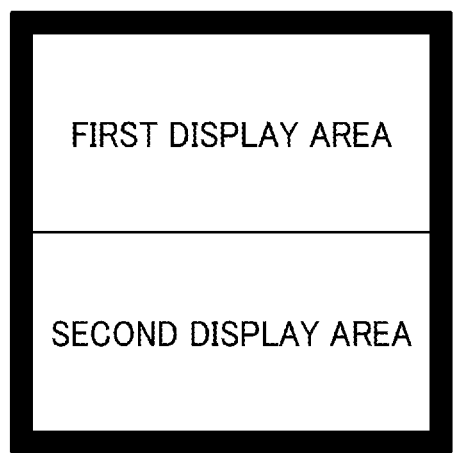
FIG. 6A and FIG. 6B are illustrations for describing examples of a first display area and a second display area of a display screen, according to an embodiment of the present disclosure.
Figure 6B:
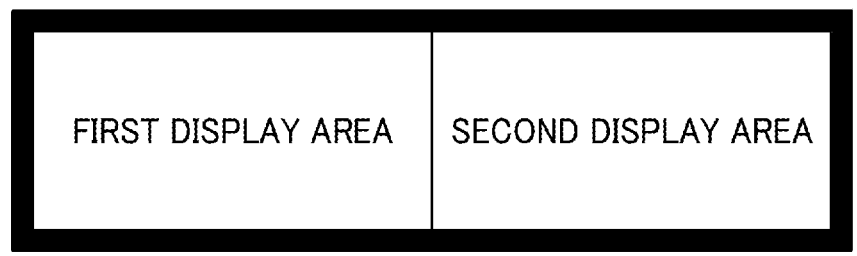

FIG. 6A and FIG. 6B are illustrations for describing examples of a first display area and a second display area of a display screen, according to the present embodiment. The first display area is an example of a display area in which the image captured by the first camera 16 is displayed. The second display area is an example of a display area in which the image captured by the second camera 18 is displayed. As illustrated in FIG. 6A or 6B, the first display area and the second display area are displayed next to each other on a display screen displayed at the first user terminal 10.

FIG. 6A illustrates an example of the display screen on which the first display area and the second display area are arranged vertically. The upper and lower positions of the first display area and the second display area may be reversed. FIG. 6B illustrates an example of the display screen on which the first display area and the second display area are arranged side by side. The left and right positions of the first display area and the second display area may be reversed.

Although the description provided above with reference to FIG. 6A and FIG. 6B is of an example in which the first display area and the second display area have rectangular shapes, the first display area and the second display area may have any other shapes. Although the description provided above with reference to FIG. 6A and FIG. 6B is of an example in which the first display area and the second display area have the same size, first display area and the second display area may have different sizes. Although the description provided above with reference to FIG. 6A and FIG. 6B is of an example in which the first display area and the second display area are displayed next to each other, the image captured by the first camera 16 may be first displayed in the first display area, and the image captured by the second camera 18 may be displayed in the second display area after the display of the image captured by the first camera 16 in the first display area. Although the description provided above with reference to FIG. 6A and FIG. 6B is of an example in which the first display area and the second display area are displayed next to each other, the first display area in which the image captured by the first camera 16 is displayed may be switched to the second display area in which the image captured by the second camera 18 is displayed.

Operation

An operation performed by the information processing system 1 is described, according to the present embodiment. FIG. 7 is a diagram illustrating an example of a usage scene of the information processing system 1, according to the present embodiment. FIG. 7 illustrates an example of a transition of a display screen displayed at the first user terminal 10.

A display screen 1000 is an example of a screen that receives an input to the first user terminal 10 for logging in to a service provided by the information processing apparatus 14. For example, the display screen 1000 is displayed when the provided service is exclusive to members. If the service is not exclusive to members, in other words, is available for anyone, the display screen 1000 may be omitted.

A display screen 1020 and a display screen 1040 are examples of screens that receive an input of selecting a particular sales floor of a product according to an operation by the purchaser or the like who operates the first user terminal 10. In the example of FIG. 7, in response to an operation by the purchaser or the like operating the first user terminal 10 of selecting "1F Special Cosmetics" on the display screen 1020, the display screen 1040 is displayed on which the sales floors of special cosmetics are classified by brands.

The purchaser or the like operating the first user terminal 10, for example, clicks a particular sales floor for which the purchaser or the like wants to view an image captured by the first camera 16 on the display screen 1040, to select the particular sales floor. In response to the selection of the particular sales floor on the display screen 1040, the first user terminal 10 receives, from the information processing apparatus 14, the image captured by the first camera 16 located in the particular sales floor selected according to the operation by the purchaser or the like, and displays a display screen 1060 on which the received image captured by of the first camera 16 is displayed in the first display area. The purchaser or the like operates the first user terminal 10 to select a desired photographing direction of the image captured by the first camera 16 on the display screen 1060, for example. Processing of displaying a partial image in the desired photographing direction selected by the purchaser or the like from the 360-degree image is performed using a known technique of creating a spherical panoramic image from an image (Mercator image) captured by a digital camera or the like that obtains a 360-degree spherical panoramic image as described above.

The purchaser or the like operating the first user terminal 10 views the image captured by the first camera 16 displayed on the display screen 1060, to check, for example, the atmosphere of the particular sales floor, products arranged in the particular sales floor. For example, when the purchaser or the like operating the first user terminal 10 finds a product that he/she is attracted and wants to receive an explanation about the product from the seller, the purchaser or the like calls the second user terminal 12 operated by the seller. The purchaser or the like can call the second user terminal 12 operated by the seller from the display screen 1060 in various ways. For example, a call button that the purchaser or the like can operate may be provided on the display screen 1060. In another example, a call from the purchaser or the like may be recognized by voice recognition or character recognition.

A display screen 1080 is an example of a screen image that is displayed when the purchaser or the like operating the first user terminal 10 and the seller operating the second user terminal 12 start communication after the purchaser or the like calls the seller. The first user terminal 10 receives, from the second camera 18, a captured image such as a line-of-sight image of the seller who starts communication, and displays the display screen 1080 on which the captured image by the second camera 18 is displayed in the second display area. The second camera 18 may be associated with the seller or may be associated with the second user terminal 12.

Figure 8:
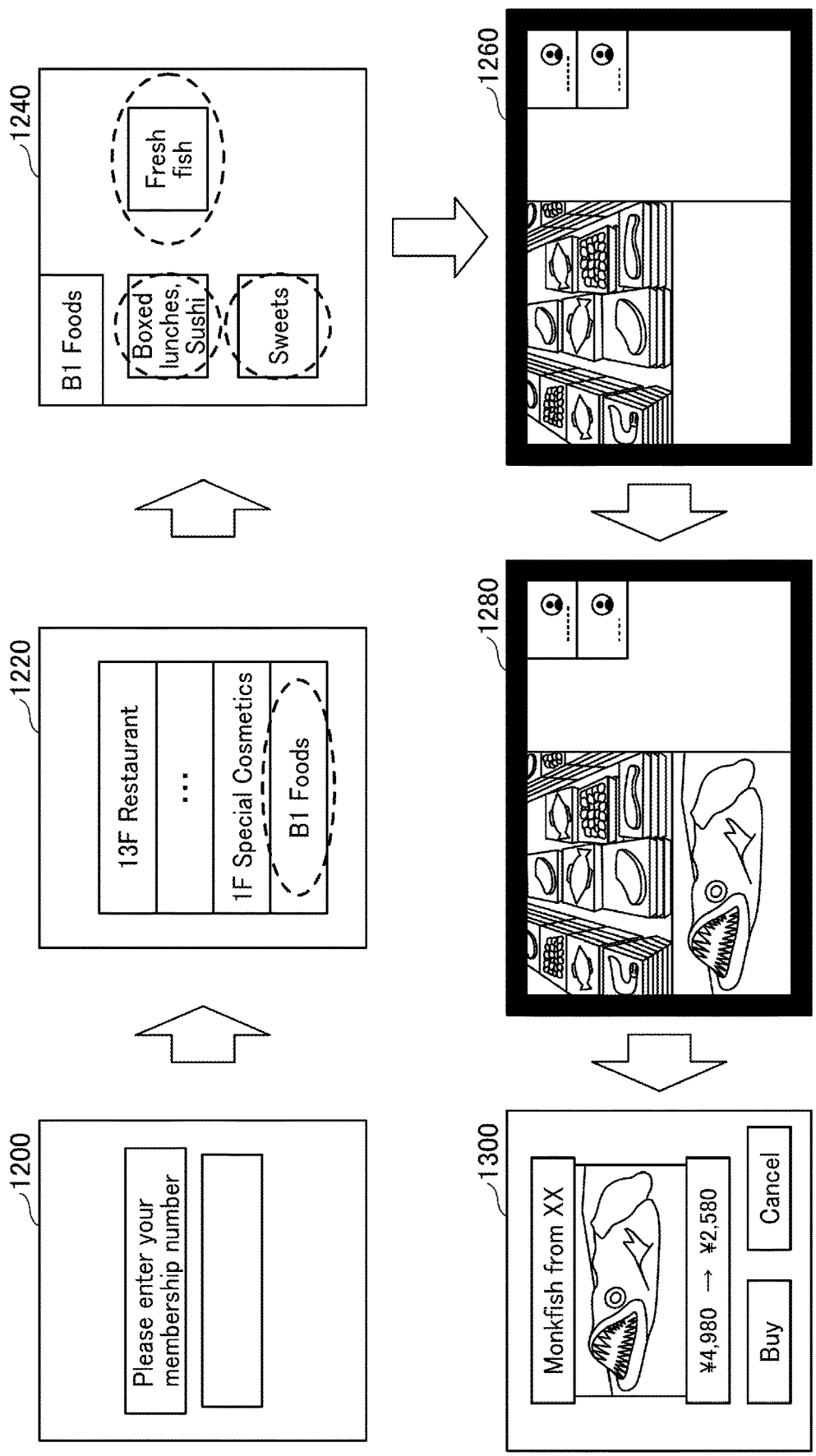
FIG. 8 is a diagram illustrating an example of a usage scene in another sales floor of the information processing system, according to an embodiment of the present disclosure.

After starting the bidirectional with the seller, the purchaser or the like can receive explanation of a product from the seller while viewing the image of the product captured by the second camera 18 included in the display screen 1080. When the purchaser or the like finds a particular product that he/she want to buy, the purchaser or the like operating the first user terminal 10 performs an operation for causing the first user terminal to display a display screen 1100, and performs an operation of inputting a purchase instruction of the particular product on the display screen 1100. The display screen 1100 is an example of a screen that receives a purchase instruction that instructs to purchase a product appearing in the image captured by the second camera 18 from the purchaser or the like. In response to receiving the purchase instruction that is received via the display screen 1100, the first user terminal 10 executes payment processing corresponding to the purchase instruction of the product from the purchaser or the like via the information processing apparatus 14. Although the description provided above with reference to FIG. 7 is of an example in which a product is cosmetics, a product may be a food as illustrated in FIG. 8. When an electronic commerce (EC) site for purchasing a product is provided, a transition button in which a URL to the EC site is embedded may be displayed on the first user terminal 10. In this case, the first user terminal 10 accesses to the EC site in response to selection of the transition button by the purchaser or the like, whereby allowing the purchaser or the like to buy a product from the EC site.

FIG. 8 is a diagram illustrating an example of a usage scene of the information processing system 1 in another sales floor, according to the present embodiment. In the present embodiment, another sales floor is a foods sales floor. FIG. 8 illustrates an example of a transition of a display screen displayed at the first user terminal 10, in similar manner as FIG. 7.

A display screen 1200 is an example of a screen that receives an input to the first user terminal 10 for logging in to a service provided by the information processing apparatus 14. For example, the display screen 1200 is displayed when the provided service is exclusive to members. If the service is not exclusive to members, in other words, is available for anyone, the display screen 1200 may be omitted.

A display screen 1220 and a display screen 1240 are examples of screens that receive an input of selecting a particular sales floor of a product according to an operation by the purchaser or the like who operates the first user terminal 10. In the example of FIG. 8, in response to an operation by the purchaser or the like operating the first user terminal 10 of selecting "B1 Foods" on the display screen 1220, the display screen 1240 is displayed on which the sales floors of foods are classified by foodstuffs. On the display screen 1040, a sales floor to which the seller wants the purchaser or the like to pay attention, such as a sales floor where products are on sale for a limited time, may be displayed in an easy-to-notice manner.

The purchaser or the like operating the first user terminal 10, for example, clicks a particular sales floor for which the purchaser or the like wants to view an image captured by the first camera 16 on the display screen 1240, to select the particular sales floor. In response to the selection of the particular sales floor, for example, "Fresh fish" on the display screen 1240, the first user terminal 10 receives, from the information processing apparatus 14, the image captured by the first camera 16 located in the particular sales floor selected according to the operation by the purchaser or the like, and displays a display screen 1260 on which the received image captured by of the first camera 16 is displayed in the first display area.

The purchaser or the like operates the first user terminal 10 to select a desired photographing direction of the image captured by the first camera 16 on the display screen 1260, for example.

The purchaser or the like operating the first user terminal 10 views the image captured by the first camera 16 displayed on the display screen 1260, to check, for example, the atmosphere of the particular sales floor, products arranged in the particular sales floor. For example, when the purchaser or the like operating the first user terminal 10 finds a product that he/she is attracted and wants to receive an explanation about the product from the seller, the purchaser or the like calls the second user terminal 12 operated by the seller.

A display screen 1280 is an example of a screen image that is displayed when the purchaser or the like operating the first user terminal 10 and the seller operating the second user terminal 12 start communication after the purchaser or the like calls the seller. The first user terminal 10 receives, from the second camera 18, a captured image such as a line-of-sight image of the seller who starts communication, and displays the display screen 1280 on which the captured image by the second camera 18 is displayed in the second display area.

After starting the bidirectional with the seller, the purchaser or the like can receive explanation of a product from the seller while viewing the image of the product captured by the second camera 18 included in the display screen 1280. When the purchaser or the like finds a particular product that he/she want to buy, the purchaser or the like operating the first user terminal 10 performs an operation for causing the first user terminal to display a display screen 1300, and performs an operation of inputting a purchase instruction of the particular product on the display screen 1300. The display screen 1300 is an example of a screen that receives a purchase instruction that instructs to purchase a product appearing in the image captured by the second camera 18 from the purchaser or the like. On the display screen 1300, the price of the product is changed from "¥4,980" to "¥2,580". For example, a price of a product may be automatically changed based on information associating an elapsed time period with a discount rate and the automatically-changed price is displayed on the display screen 1300. In another example, the seller may change manually the price. In the present embodiment, the description provided above is of an example in which the price of the product is displayed on the display screen 1300. In another example, an image of price of a product may be superimposed on an image of each product displayed on the display screen 1280 based on product information read from the image captured by the second camera 18. The product information is obtained by, for example, by reading a barcode or a product image. This configuration allows the purchaser or the like to input the purchase instruction of a product on the display screen 1300.

In response to receiving the purchase instruction that is received via the display screen 1300, the first user terminal 10 executes payment processing corresponding to the purchase instruction of the product from the purchaser or the like via the information processing apparatus 14. The description provided above with reference to FIG. 7 and FIG. 8 is of an example in which transaction is performed between a company and a general consumer, in other words, a B2C. The information processing system 1 is also applicable to a B2B (transaction between companies) as illustrated in FIG. 9, for example.

Figure 9:
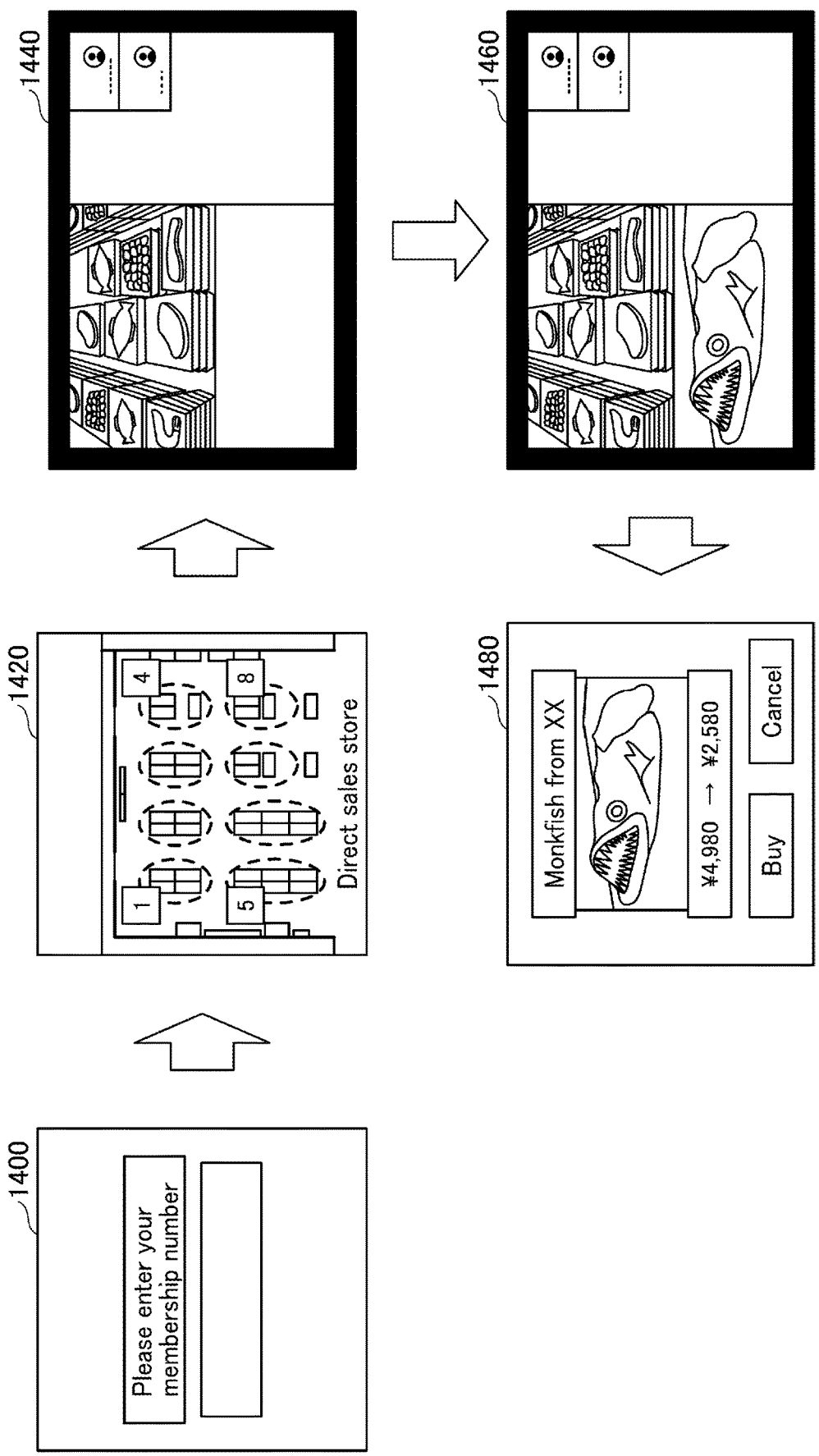
FIG. 9 is an illustration of an example of another use scene of the information processing system in a transaction between dealers, according to an embodiment of the present disclosure.

FIG. 9 is an illustration of an example of another use scene of the information processing system 1 in a transaction between dealers, according to the present embodiment. In the present embodiment, a buyer such as a buying dealer in a wholesale market for fresh fish, vegetables and fruits or a direct sales store is the purchaser of the like who operates the first user terminal 10. In the present embodiment, a supplier such as an intermediate wholesaler or a wholesaler is the seller who operates the second user terminal 12. In the embodiment, an example is described in which the information processing system is applicable to communication between the buyer such as a buying dealer and the supplier such as an intermediate wholesaler or a wholesaler in a wholesale market of fresh fish, vegetables and fruits or a direct sales store. In the following description, the buyer such as a buying dealer is referred to simply as a "purchaser or the like." In the following description, the supplier such as an intermediate wholesaler or a wholesaler is referred to simply as a "seller." FIG. 9 illustrates an example of a transition of a display screen displayed at the first user terminal 10, in a similar manner as FIG. 7, for example.

A display screen 1400 is an example of a screen that receives an input to the first user terminal 10 for logging in to a service provided by the information processing apparatus 14. For example, the display screen 1400 is displayed when the provided service is exclusive to members. If the service is not exclusive to members, in other words, is available for anyone, the display screen 1400 may be omitted.

A display screen 1420 is an example of a screen that receive an input of selecting a particular sales floor (e.g., a wholesale market of fresh fish, vegetables and fruits, or a direct sales store) of a product according to an operation by the purchaser or the like who operates the first user terminal 10. In the example of FIG. 8, the display screen 1420 receives an input of selecting a particular sales floor of a product according to an operation by the purchaser or the like who operates the first user terminal 10. FIG. 8 illustrates an example in which the sales floor is a shelf of the wholesale market of fresh fish, vegetables and fruits, or a direct sales store. In response to an operation by the purchaser or the like operating the first user terminal 10 of selecting a desired shelf or area that the purchaser or the like want to view on the display screen 1420, the first user terminal 10 displays a display screen 1440 displaying a sales floor. On the display screen 1440, a sales floor to which the seller wants the purchaser or the like to pay attention may be displayed in an easy-to notice-manner in view of counter measures against food loss. For example, an image of red frame is superimposed on an image of the sales floor to which the seller wants the purchaser or the like to pay attention. In another example, the display screen 1440 may display a sales floor of a product that has been on display for a predetermined time period or more in view of countermeasures against food loss.

The purchaser or the like operating the first user terminal 10, for example, clicks a particular sales floor for which the purchaser or the like wants to view an image captured by the first camera 16 on the display screen 1420, to select the particular sales floor. The first user terminal 10 receives, from the information processing apparatus 14, the image captured by the first camera 16 located in the particular sales floor selected according to the operation by the purchaser or the like, and displays a display screen 1440 on which the received image captured by of the first camera 16 is displayed in the first display area. The purchaser or the like operates the first user terminal 10 to select a desired photographing direction of the image captured by the first camera 16 on the display screen 1440, for example.

The purchaser or the like operating the first user terminal 10 views the image captured by the first camera 16 displayed on the display screen 1440, to check, for example, the atmosphere of the particular sales floor, products arranged in the particular sales floor. For example, when the purchaser or the like operating the first user terminal 10 finds a product that he/she is attracted and wants to receive an explanation about the product from the seller, the purchaser or the like calls the second user terminal 12 operated by the seller.

A display screen 1460 is an example of a screen image that is displayed when the purchaser or the like operating the first user terminal 10 and the seller operating the second user terminal 12 start communication after the purchaser or the like calls the seller. The first user terminal 10 receives, from the second camera 18, a captured image such as a line-of-sight image of the seller who starts communication, and displays the display screen 1460 on which the captured image by the second camera 18 is displayed in the second display area.

After starting the bidirectional with the seller, the purchaser or the like can receive explanation of a product from the seller while viewing the image of the product captured by the second camera 18 included in the display screen 1460. When the purchaser or the like finds a particular product that he/she want to buy, the purchaser or the like operating the first user terminal 10 performs an operation for causing the first user terminal to display a display screen 1480, and performs an operation of inputting a purchase instruction of the particular product on the display screen 1480. The display screen 1480 is an example of a screen that receives a purchase instruction that instructs to purchase a product appearing in the image captured by the second camera 18 from the purchaser or the like. On the display screen 1480, the price of the product is changed from "¥4,980" to "¥2,580". In response to receiving the purchase instruction that is received via the display screen 1480, the first user terminal 10 executes payment processing corresponding to the purchase instruction of the product from the purchaser or the like via the information processing apparatus 14. As another example of the transaction between dealers, the information processing system may be applied to regional development such as buying by dealers of shops or associations in various regions (local areas).

Figure 10:
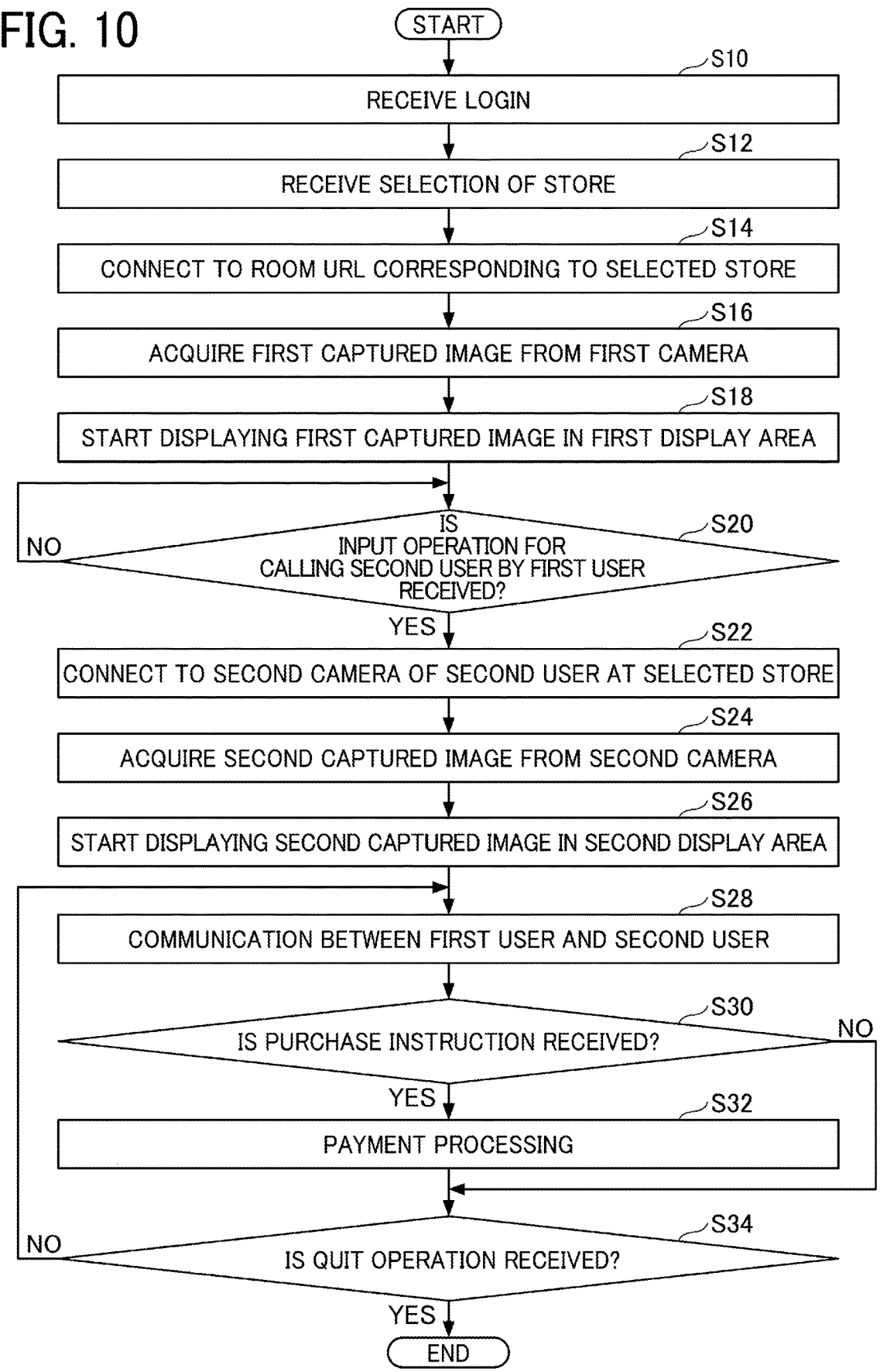
FIG. 10 is a flowchart illustrating an example of an operation performed by the information processing system, according to an embodiment of the present disclosure.

In the present embodiment, an operation performed by the information processing apparatus 14 of the information processing system 1 is described using the usage scene illustrated in FIG. 7 as an example. FIG. 10 is a flowchart illustrating an example of an operation performed by the information processing system 1, according to the present embodiment.

In step S10, the information processing apparatus 14 receives a login request from the first user terminal 10. When the login is successful, the information processing apparatus 14 performs processes of step S12 and the subsequent steps. When the login fails, the information processing apparatus 14 does not perform the processes of step S12 and the subsequent steps. In the following, the description is provided on the assumption that the login is successful. In another example, the information processing system 1 can be used without the login processing. In this case, the process of step S10 is omitted, and a permission to use the first user terminal 10 is assigned to a guest user. The information processing system 1 may request the purchaser or the like to whom the permission as a guest user to log in at any one of the subsequent steps such as a purchase instruction in step S30, and execute the processing of step S10. In another example, the information processing system 1 may prompt the purchaser or the like to perform member registration before the execution of processing of step S10.

In step S12, the distribution management unit 50 of the information processing apparatus 14 receives selection of the particular sales floor of a product from the first user terminal 10 according to an operation by the purchase or the like to the first user terminal. In step S14, the distribution management unit 50 refers to the distribution settings information of FIG. 5, for example, to connect to the room URL corresponding to the selected sales floor.

In step S16, the distribution data generation unit 52 acquires the captured image received from the first camera 16. In step S18, the distribution data generation unit 52 generates destitution data of a display screen for displaying the image captured by the first camera 16 in the first display area. The distribution management unit 50 transmits the generated distribution data of the display screen to the first user terminal 10. Based on the received distribution data of the display screen, the first user terminal 10 displays, for example, the display screen 1060 of FIG. 7 in which the image captured by the first camera 16 is displayed in the first display area.

For example, in the display screen 1060 of FIG. 7, the purchaser or the like who operates the first user terminal 10 selects a desired photographing direction of the image captured by the first camera 16 displayed in the first display area of the display screen 1060, to check, for example, the atmosphere of the sales floor, products arranged in the sales floor. For example, when the purchaser or the like operating the first user terminal 10 finds a product that he/she is attracted and wants to receive an explanation about the product from the seller, the purchaser or the like calls the second user terminal 12 operated by the seller.

In step S20, the distribution management unit 50 waits until an operation input is received from the first user terminal 10 for calling the second user terminal 12 operated by the seller according to an operation by the purchaser or the like operating the first user terminal 10. In response to receiving the input operation by the purchaser or the like for calling the seller from the first user terminal 10, the operation proceeds to step S22. In step S22, the distribution management unit 50 connects to the second camera 18 of the seller called by the purchaser or the like.

In step S24, the distribution data generation unit 52 acquires the captured image received from the second camera 18. In step S26, the distribution data generation unit 52 generates distribution data of a display screen for displaying the image captured by the second camera 18 in the second display area. The distribution management unit 50 transmits the generated distribution data of the display screen to the first user terminal 10. Based on the received distribution data of the display screen, the first user terminal 10 displays, for example, the display screen 1080 of FIG. 7 in which the image captured by the first camera 16 is displayed in the first display area and the image captured by the second camera 18 is displayed in the second display area.

In step S28, the communication function providing unit 56 provides the purchaser who uses the first user terminal 10 and the seller who uses the second user terminal 12 with a voice communication function using a call function or a text communication function using a chat function.

For example, on the display screen 1080 of FIG. 7, after starting the bidirectional with the seller, the purchaser or the like operating the first user terminal 10 receives explanation of a product from the seller while viewing the image (e.g., the seller's line-of-sight image) of the product captured by the second camera 18 included in the display screen 1080. Thus, according to the present embodiment, the purchaser or the like can check a surrounding situation such as the atmosphere of the sales floor and products arranged on the sales floor and also check the details of a desired product such as texture and freshness of the product as needed. Further, according to the present embodiment, the purchaser or the like can receive the explanation of the desired product from the seller as the purchaser or the like has a feeling of actually being in the sales floor, while viewing the photographed image of the product, for example. When the purchaser or the like finds a particular product that he/she want to buy, the purchaser or the like operating the first user terminal 10 performs an operation for causing the first user terminal to display a display screen 1100, and performs an operation of inputting a purchase instruction of the particular product on the display screen 1100.

In step S30, the purchase processing unit 58 of the information processing apparatus 14 determines whether a purchase instruction is received from the first user terminal 10. In response to receiving the purchase instruction from the first user terminal 10, the operation proceeds to a process of step S32. In step S32, the purchase processing unit 58 performs payment processing of the product according to the purchase instruction in cooperation with the payment system 22. When the purchase processing unit 58 receives no purchase instruction from the first user terminal 10, the payment processing in step S32 is skipped.

In step S34, the distribution management unit 50 determines whether a quit operation by the purchaser or the like operating the first user terminal 10 is received from the first user terminal 10. When no quit operation is received, the operation returns to step S28. The distribution management unit 50 repeats the processes of steps S28 to S34. In response to receiving the quit operation, the distribution management unit 50 ends the operation of the flowchart of FIG. 10.

Variations

In the present embodiment, the description provided above is of an example in which the first camera 16 is located in the sales floor. In another example, the first camera 16 may be moved. For example, an employee in charge of the sales floor carries the first camera 16. In another example, an employee patrolling the sales floor carries the first camera 16. In another example, the first camera 16 may be attached to a self-moving robot that patrols the sales floor.

In the present embodiment, the description provided above is of an example in which the purchaser or the like who operates the first user terminal 10 selects a desired sales floor to cause the image captured by the first camera 16 to be displayed in the first display area of the display screen. However, this is merely one example. In another example, area coordinates within a predetermined distance from the position of the first camera 16 may be managed. When the position of the second user terminal 12 enters the area coordinates within the predetermined distance from the position of the first camera 16, display of the image captured by the first camera 16 in the first display area may be started. The display of the image captured by the second camera 18 may be started at the same time when the image captured by the first camera 16 is displayed. In another example, the display of the image captured by the second camera 18 may be started before the image captured by the first camera 16 is displayed.

For example, the seller is associated with the purchaser or the like in response to a login by the purchaser or the like, and when the second camera 18 operated by the seller who moves enters the area coordinates within the predetermined distance from the first camera 16, the information processing system 1 displays the display screen including the image captured by the first camera 16 and the image captured by the second camera 18 on the first user terminal 10 operated by the purchaser or the like. One or more of embodiments or variations can be implemented by acquiring position information of each device such as the first camera 16 and the second camera 18 using short-range wireless communication network, such as beans, the radiofrequency identification (RFID), or Bluetooth®, which are indoor sensors.

According to an aspect of the present disclosure, circuitry such as the CPU 501 of the information processing apparatus 14 is configured to receive a purchase instruction relating to a subject included in the second captured image from the first user terminal, and perform purchase processing according to the purchase instruction. According to an aspect of the present disclosure, the first user is a purchaser or a prospective purchaser who performs a purchase relating to a subject included in the second captured image, and the second user is a seller who performs sales relating to the subject.

As described above, according to the present embodiment, the purchaser or the like, who is an example of the first user, can check an image captured by the second camera 18 operated by the seller, who is an example of the second user, while communicate with each other. The photographing direction of the second camera is defined by a direction in which the seller is facing or a direction in which the seller causes the second camera 18 faces. This configuration allows the purchaser or the like to communicate a request to the seller, thereby making it easy to display the image captured by the second camera 18 representing an image of a direction in which the seller is looking that matches the direction in which the purchaser or like wants to look.

Using systems of the related art, users cannot check details of products such as texture or freshness as needed while checking a surrounding situation such as an atmosphere of a store or product lined up in the store.

According to one or more embodiments of the present disclosure, communication between users is made more realistic.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in the above-described embodiments are merely one example of the plural computing environments that implement the embodiments disclosed herein. The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing apparatus communicable with a first user terminal operated by a first user and a second user terminal operated by a second user, the information processing apparatus comprising circuitry configured to:
receive, from the first user terminal, a selection of a first image capturing device among multiple image capturing devices installed in multiple store areas respectively;
generate distribution data according to which the first user terminal displays a first captured image and a second captured image, the first captured image being an image captured by the selected first image capturing device in a first photographing direction selected by the first user, the second captured image being an image captured by a second image capturing device of the second user in a second photographing direction; and
transmit the generated distribution data to the first user terminal,
wherein the distribution data generated by the circuitry is data for a display screen of the first user terminal to include a first display area displaying the first captured image captured by the first image capturing device and a second display area displaying the second captured image captured by the second image capturing device worn by the second user or the second image capturing device built in the second user terminal operated by the second user, and
wherein the circuitry is further configured to add the second captured image to the display screen of the first user terminal on which the first captured image is being displayed, according to an input operation by the first user, so that the first captured image and the second captured image are displayed next to each other on the display screen.

2. The information processing apparatus of claim 1, wherein the circuitry switches display of the display screen from the first captured image to the second captured image, according to an input operation by the first user.

3. The information processing apparatus of claim 1, wherein a bidirectional communication function is provided by the circuitry to allow the first user and the second user to communicate with each other by voice or text.

4. The information processing apparatus of claim 1, wherein
the first image capturing device is configured to capture an image of 360-degree surroundings, and
the circuitry generates the first captured image in the first photographing direction selected by the first user from the image of 360-degree surroundings.

5. The information processing apparatus of claim 1, wherein the circuitry is further configured to:
receive an acquisition instruction relating to a subject included in the second captured image from the first user terminal; and
perform acquisition processing according to the acquisition instruction.

6. The information processing apparatus of claim 1, wherein
the first user is a person who performs or is expected to perform acquisition relating to a subject included in the second captured image, and
the second user is a person who provides the subject.

7. The information processing apparatus of claim 1, wherein
the circuitry is further configured to store, in a memory, at least one of the first captured image captured by the first image capturing device, the second captured image captured by the second image capturing device, or information generated through interaction between the first user and the second user using a bidirectional communication function.

8. An information processing system comprising:
a first user terminal operated by a first user;
a second user terminal operated by a second user; and
an information processing apparatus,
the first user terminal, the second user terminal, and the information processing apparatus being communicable with one another,
the information processing apparatus including first circuitry configured to:

receive, from the first user terminal, a selection of a first image capturing device among multiple image capturing devices installed in multiple store areas respectively;

generate distribution data according to which the first user terminal displays a first captured image and a second captured image, the first captured image being an image captured by the selected first image capturing device in a first photographing direction selected by the first user, the second captured image being an image captured by a second image capturing device of the second user in a second photographing direction; and transmit the generated distribution data to the first user terminal, the first user terminal including second circuitry configured to:

display the first captured image and the second captured image based on the distribution data received from the information processing apparatus; and perform processing that allows the first user to perform bidirectional communication with the second user, the second user terminal including third circuitry configured to perform processing that allows the second user to perform the bidirectional communication with the first user, wherein the distribution data generated by the first circuitry is data for a display screen of the first user terminal to include a first display area displaying the first captured image captured by the first image capturing device and a second display area displaying the second captured image captured by the second image capturing device worn by the second user or the second image capturing device built in the second user terminal operated by the second user, and wherein the first circuitry is further configured to add the second captured image to the display screen of the first user terminal on which the first captured image is being displayed, according to an input operation by the first user, so that the first captured image and the second captured image are displayed next to each other on the display screen.

9. An information processing method performed by an information processing apparatus communicable with a first user terminal operated by a first user and a second user terminal operated by a second user, the method comprising:

receiving, from the first user terminal, a selection of a first image capturing device among multiple image capturing devices installed in multiple store areas respectively;

generating distribution data according to which the first user terminal displays a first captured image and a second captured image, the first captured image being an image captured by the selected first image capturing device in a first photographing direction selected by the first user, the second captured image being an image captured by a second image capturing device of the second user in a second photographing direction; and transmitting the generated distribution data to the first user terminal, wherein the distribution data generated is data for a display screen of the first user terminal to include a first display area displaying the first captured image captured by the first image capturing device and a second display area displaying the second captured image captured by the second image capturing device worn by the second user or the second image capturing device built in the second user terminal operated by the second user, and wherein the generating includes adding the second captured image to the display screen of the first user terminal on which the first captured image is being displayed, according to an input operation by the first user, so that the first captured image and the second captured image are displayed next to each other on the display screen.

10. The information processing method of claim 9, wherein the generating includes switching display of the display screen from the first captured image to the second captured image, according to an input operation by the first user.

11. The information processing method of claim 9, wherein a bidirectional communication function is provided to allow the first user and the second user to communicate with each other by voice or text.

12. The information processing method of claim 9, wherein
the first image capturing device is configured to capture an image of 360-degree surroundings, and
the generating includes generating the first captured image in the first photographing direction selected by the first user from the image of 360-degree surroundings.

13. The information processing method of claim 9, further comprising:
receiving an acquisition instruction relating to a subject included in the second captured image from the first user terminal; and
performing acquisition processing according to the acquisition instruction.

14. The information processing method of claim 9, wherein
the first user is a person who performs or is expected to perform acquisition relating to a subject included in the second captured image, and
the second user is a person who provides the subject.

15. The information processing method of claim 9, further comprising storing, in a memory, at least one of the first captured image captured by the first image capturing device, the second captured image captured by the second image capturing device, or information generated through interaction between the first user and the second user using a bidirectional communication function.

16. The information processing apparatus of claim 1, wherein
the selection of the first image capturing device is made in response to a selection of one of the multiple store areas, where the first image capturing device is installed, shown on a display screen of the first user terminal.

* * * * *